United States Patent
Tanaka

(12) 
(10) Patent No.: US 6,233,207 B1
(45) Date of Patent: May 15, 2001

(54) POLARITY SWITCHING SIGNAL GENERATOR, METHOD OF THE SAME, AND OPTICAL DISK DRIVE

(75) Inventor: Norio Tanaka, Kanagawa (JP)

(73) Assignee: Somy Corporation, Tokyo (JP)

( * ) Notice: Subject to any disclaimer, the term of this patent is extended or adjusted under 35 U.S.C. 154(b) by 0 days.

(21) Appl. No.: 09/280,744

(22) Filed: Mar. 29, 1999

(30) Foreign Application Priority Data

Mar. 31, 1998 (JP) .................................................. 10-086756

(51) Int. Cl.$^7$ ...................................................... G11B 7/09

(52) U.S. Cl. .................................... 369/44.26; 369/44.25; 369/44.29; 369/44.35

(58) Field of Search ............................... 369/44.25, 44.26, 369/44.27, 44.28, 44.29, 44.32, 44.34, 44.35, 47, 54, 58, 124.01, 124.15

(56) References Cited

U.S. PATENT DOCUMENTS 5,896,365 * 4/1999 Hiroki .......................... 369/44.28 X
6,118,748 * 9/2000 Morimoto ........................... 389/112

* cited by examiner

*Primary Examiner*—Muhammad Edun
(74) *Attorney, Agent, or Firm*—Frommer Lawrence & Haug, LLP; William S. Frommer

(57) ABSTRACT

A polarity switching signal generator able to stably generate a suitable polarity switching signal for inverting the polarity of a tracking error signal, wherein a reference value stored in a reference value storage circuit is updated by a rotational angle indicated by a rotational angle signal at a switching position of a land and groove captured by a capture circuit when an address decode signal is normal and wherein, further, a comparator compares the reference value stored in the reference value storage circuit with the rotational angle indicated by the rotational angle signal and generates a polarity switching signal instructing the switching of the polarity when they match.

14 Claims, 6 Drawing Sheets

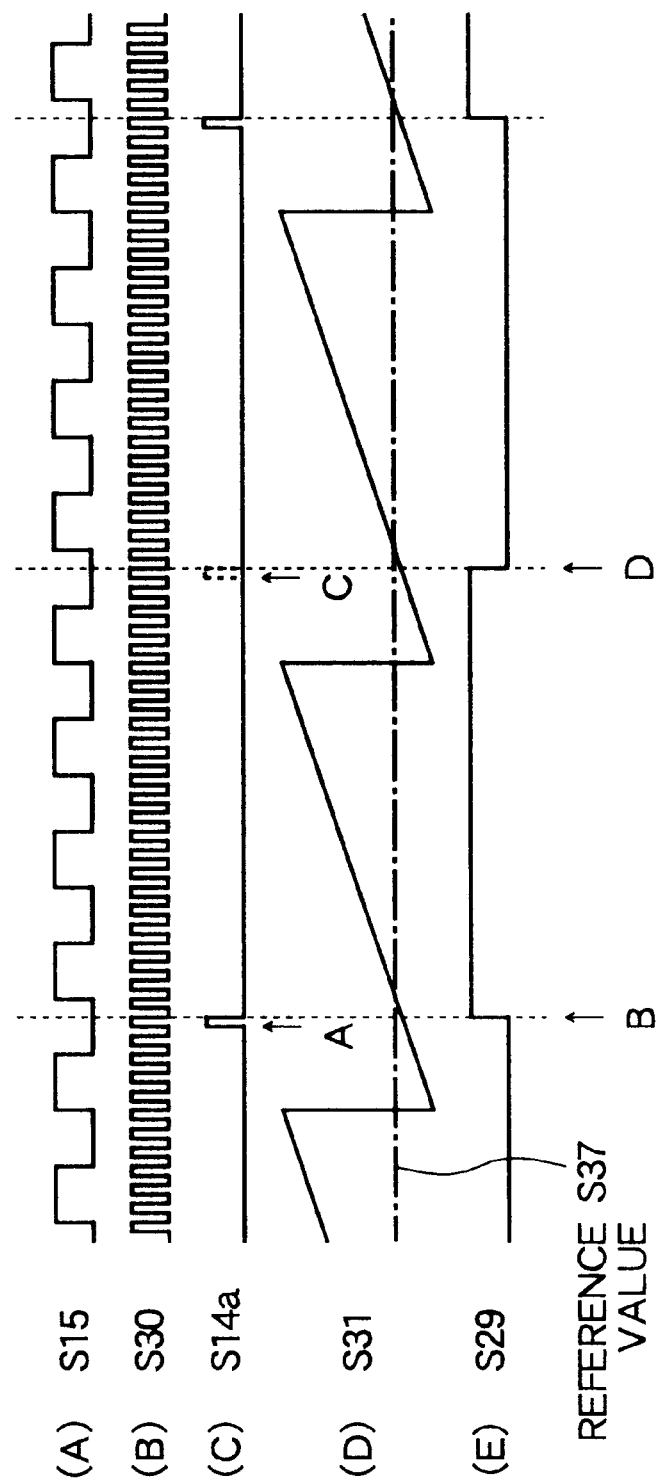

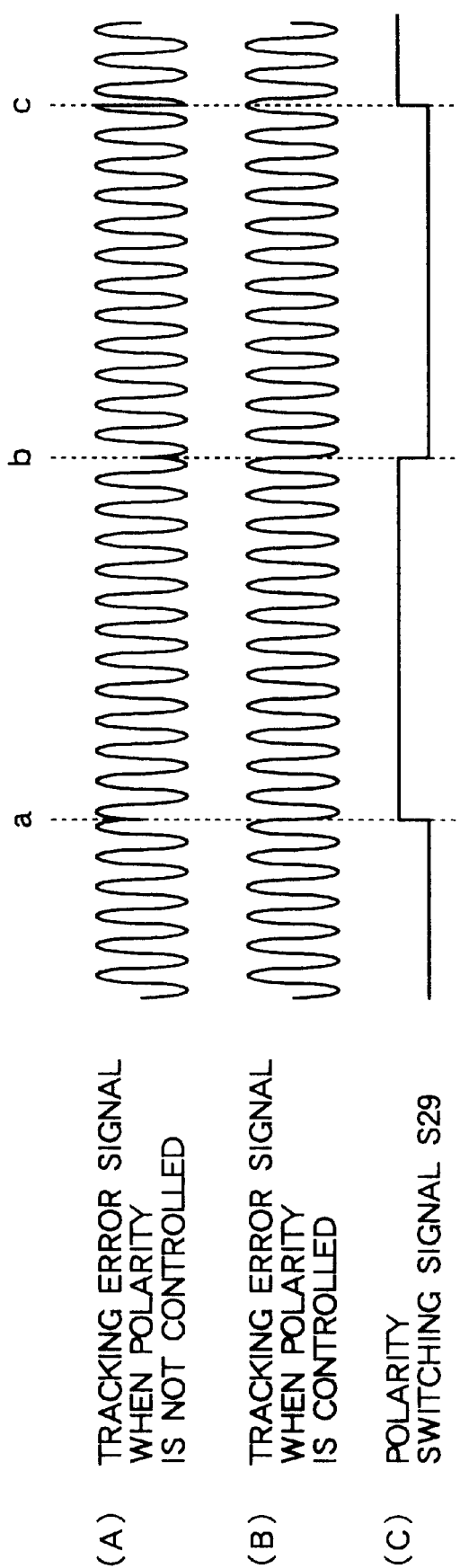

POLARITY SWITCHING SIGNAL GENERATOR, METHOD OF THE SAME, AND OPTICAL DISK DRIVE

BACKGROUND OF THE INVENTION

1. Field of the Invention

The present invention relates to a polarity switching signal generator able to stably generate a suitable tracking error signal, a method of the same, and an optical disk drive.

2. Description of the Related Art

Digital versatile disk-random access memory (DVD-RAM) and other rewritable optical disks are now in use.

Such rewritable optical disks include ones which use for example a land groove system as a disk format. In this case, the recording surface of the optical disk is provided with data areas in which only guide grooves for recording and reproducing any information and address areas in which absolute positions on a disk are stored by pits.

The formats of the land-groove system can be roughly divided in a double spiral format and a single spiral format.

In the double spiral format, as shown in FIG. 1, a land track 50 and a groove track 51 are located next to each other. Further, in the single spiral format, as shown in FIG. 2, a land track 52 and a groove track 53 are located one after the other for every circuit to form one track as a whole.

Below, the tracking servo control of a recording and reproduction apparatus of the related art for recording and reproducing data to and from a DVD-RAM of the single spiral format will be explained.

FIG. 3 is a block diagram of an optical disk drive 1 of the related art for realizing the tracking servo control of a recording and reproduction apparatus of a DVD-RAM disk.

As shown in FIG. 3, in the optical disk drive 1, a DVD-RAM disk 2 is driven to rotate by a spindle motor 15. A laser beam from a laser 3 is fired through an object lens to a position on the recording surface of the DVD-RAM disk 2 under the control of a tracking coil 4. The reflected laser beam is received by a photoreceptor 5.

The photoreceptor 5 converts the reflected laser beam from the DVD-RAM disk 2 to a tracking error signal S5a indicating the deviation of tracking and a sum signal S5b indicating the amount of the light of the reflected laser beam and outputs these to A/D converters 6 and 7 respectively.

The tracking error signal S5a and the sum signal S5b are converted to a digital tracking error signal S6 and a sum signal S7 and output to a normalizer 8.

The normalizer 8 normalizes the tracking error signal S6 so that its level does not change and outputs the normalized tracking error signal S8 to a polarity switch 9.

On the other hand, the address S5c read from the DVD-RAM disk 2 is output from the photoreceptor 5 to the last sector detector 13. The last sector detector 13 detects a last sector signal S13 indicating a sector just before the land and the groove are switched on the basis of address S5c.

Next, a one-sector delay unit 14 delays the last sector signal S13 by exactly one sector's worth of time to produce a polarity switching signal S14 and outputs the polarity switching signal S14 to the polarity switch 9.

Based on the polarity switching signal S14, the polarity switch 9 inverts the polarity of the tracking error signal S8 in accordance with need to produce a tracking error signal S9 of a controlled polarity. It outputs the tracking error signal S9 to a phase compensation digital filter 10.

It is necessary to control the polarity of the tracking error signal SB in this way because the polarity of the tracking error signal becomes inverted between when tracing a land and when tracing a groove.

The tracking error signal S9 is phase-compensated and converted to an analog signal in the D/A converter 11 to produce a drive signal S11.

The drive signal S11 is amplified by a drive amplifier, then output to the tracking coil 4 as a drive signal S12 to drive the tracking coil 4.

Summarizing the problems to be solved by the invention, in the optical disk drive 1 of the related art shown in FIG. 3, as describe below, the polarity switching signal S14 is not suitably produced, so if suffers from the disadvantage that the tracking servo control becomes unstable.

Specifically, when the recording surface of the DVD-RAM disk 2 becomes dirty and the last sector cannot be detected, when starting to trace a track after a seek operation, when using a zoned constant linear velocity (CLV) format where the number of the address areas 60 present in one turn of the disk differs for each zone as shown in FIG. 4 and the rotating speed of a spindle motor 15 will not stabilize at the point of change of zones, etc. the polarity switching signal S14 is not suitably produced.

Note that in a DVD-RAM of the CAV format, as shown in FIG. 5, the address areas 70 and the data areas 71 are arranged radially.

When the polarity switching signal S14 is not suitably produced and the timing of the polarity switching becomes off, a suitable tracking error signal S9 is not produced while the polarity is wrong and the tracking servo control becomes unstable state.

Further, during a seek operation, since an optical pick-up is moving over the tracks, the last sector cannot be detected and the polarity cannot be suitably controlled in the polarity switch 9. Therefore, during a seek operation, the tracking error signal S9 becomes discontinuous at the boundary between a land and a groove, so there is the disadvantage that a count error occurs in the traverse counter which counts the number of tracks being traversed.

SUMMARY OF THE INVENTION

An object of the present invention is to provide a polarity switching signal generator and method able to stably generate a suitable polarity switching signal for inverting the polarity of a tracking error signal and an optical disk drive able to realize stable tracking servo control.

According to a first aspect of the present invention, there is provided a polarity switching signal generator for generating a polarity switching signal for use in switching a polarity of a tracking error signal in accordance with a switching position between a land and groove during tracking servo control of an optical disk in which lands and grooves are alternately arranged in a radial direction, comprising a rotational angle generating means for generating a rotational angle of said optical disk on the basis of a rotation signal based on rotation of said optical disk input from a driving means for driving the rotation of said optical disk; a switching position detecting means for detecting a switching position between a land and groove on the basis of an address signal read from said optical disk; a rotational angle determining means for determining said rotational angle generated by said rotational angle generating means at a timing in accordance with the detection of the switching position between a land and groove; a reference value storing means for storing a reference value to be compared with said rotational angle generated by said rotational angle generating means; a reference value setting means for updating the reference value stored in said reference value storing means with the rotational angle determined by said rotational angle determining means when said address signal is correct; and a comparing means for generating a polarity switching signal instructing the inversion of the polarity of the tracking error signal when the rotational angle generated by said rotational angle generating means matches with the reference value stored in said reference value storing means.

Preferably, said reference value storing means holds the stored reference value when error has occurred in said address signal.

Preferably, said rotation signal comprises an FG signal.

Preferably, further provision is made of a phase synchronization circuit for receiving as input the rotation signal based on the rotation of said optical disk from said driving means and generating a new rotation signal improved in resolution from the input rotation signal and said rotational angle generating means generates a rotational angle of said optical disk on the basis of said new rotation signal input from said phase synchronization circuit.

Preferably, the optical disk is a rewritable optical disk.

According to a second aspect of the present invention, there is provided an optical disk drive for driving an optical disk where lands and grooves are alternately arranged in a radial direction, comprising a rotational angle generating means for generating a rotational angle of said optical disk on the basis of a rotation signal based on rotation of said optical disk input from a driving means for driving the rotation of said optical disk; a switching position detecting means for detecting a switching position between a land and groove on the basis of an address signal read from said optical disk; a rotational angle determining means for determining said rotational angle generated by said rotational angle generating means at a timing in accordance with the detection of the switching position between a land and groove; a reference value storing means for storing a reference value to be compared with said rotational angle generated by said rotational angle generating means; a reference value setting means for updating the reference value stored in said reference value storing means with the rotational angle determined by said rotational angle determining means when said address signal is correct; a comparing means for generating a polarity switching signal instructing the inversion of the polarity of the tracking error signal when the rotational angle generated by said rotational angle generating means matches with the reference value stored in said reference value storing means; a polarity switching means for switching the polarity of a first tracking error signal generated on the basis of the result of the reception of the reflected light of said optical disk on the basis of the polarity switching signal generated by said comparison means to produce a second tracking error signal; and a driving means for driving the optical disk on the basis of said second tracking error signal.

According to a third aspect of the present invention, there is provided a polarity switching signal generation method for generating a polarity switching signal for use in switching a polarity of a tracking error signal in accordance with a switching position between a land and groove during tracking servo control of an optical disk in which lands and grooves are alternately arranged in a radical direction, comprising the steps of generating a rotational angle of said optical disk on the basis of a rotation signal based on rotation of said optical disk input from a driving means for driving the rotation of said optical disk; detecting a switching position between a land and groove on the basis of an address signal read from said optical disk; determining said generated rotational angle at a timing in accordance with the detection of the switching position between a land and a groove; updating a reference value with the rotational angle determined when said address signal is correct; and generating a polarity switching signal instructing the inversion of the polarity of the tracking error signal when the generated rotational angle matches with the reference value.

BRIEF DESCRIPTION OF THE DRAWINGS

These and other objects and features of the present invention will become clearer from the following description of the preferred embodiments given with reference to the accompanying drawings, in which:

FIGS. 7A to 7E are timing charts of some of the signals shown in FIG. 6, where

FIG. 7A is a waveform diagram of an FG signal output from a spindle motor,

FIG. 7B is a waveform diagram of an FG signal output from a PLL circuit,

FIG. 7C is a waveform diagram of a last sector signal,

FIG. 7D is a waveform diagram of a rotational angle signal, and

FIG. 7E is a waveform diagram of polarity switching signal; and

FIGS. 8A to 8C are timing charts of some of the signals shown in FIG. 6, where

FIG. 8A is a waveform diagram of a tracking error signal of the related art where no polarity control is performed, FIG. 8B is a waveform diagram of a tracking error signal output from a polarity switch shown in FIG. 6, and FIG. 8C is a waveform diagram of a polarity switching signal shown in FIG. 6.

DESCRIPTION OF THE PREFERRED EMBODIMENTS

Below, a DVD-RAM recording and reproduction apparatus of an embodiment of the present invention for recording and reproduction on and from a DVD-RAM of the single spiral format will be explained.

The DVD-RAM recording and reproduction apparatus of the present embodiment is characterized by its tracking servo control.

Figure 6:
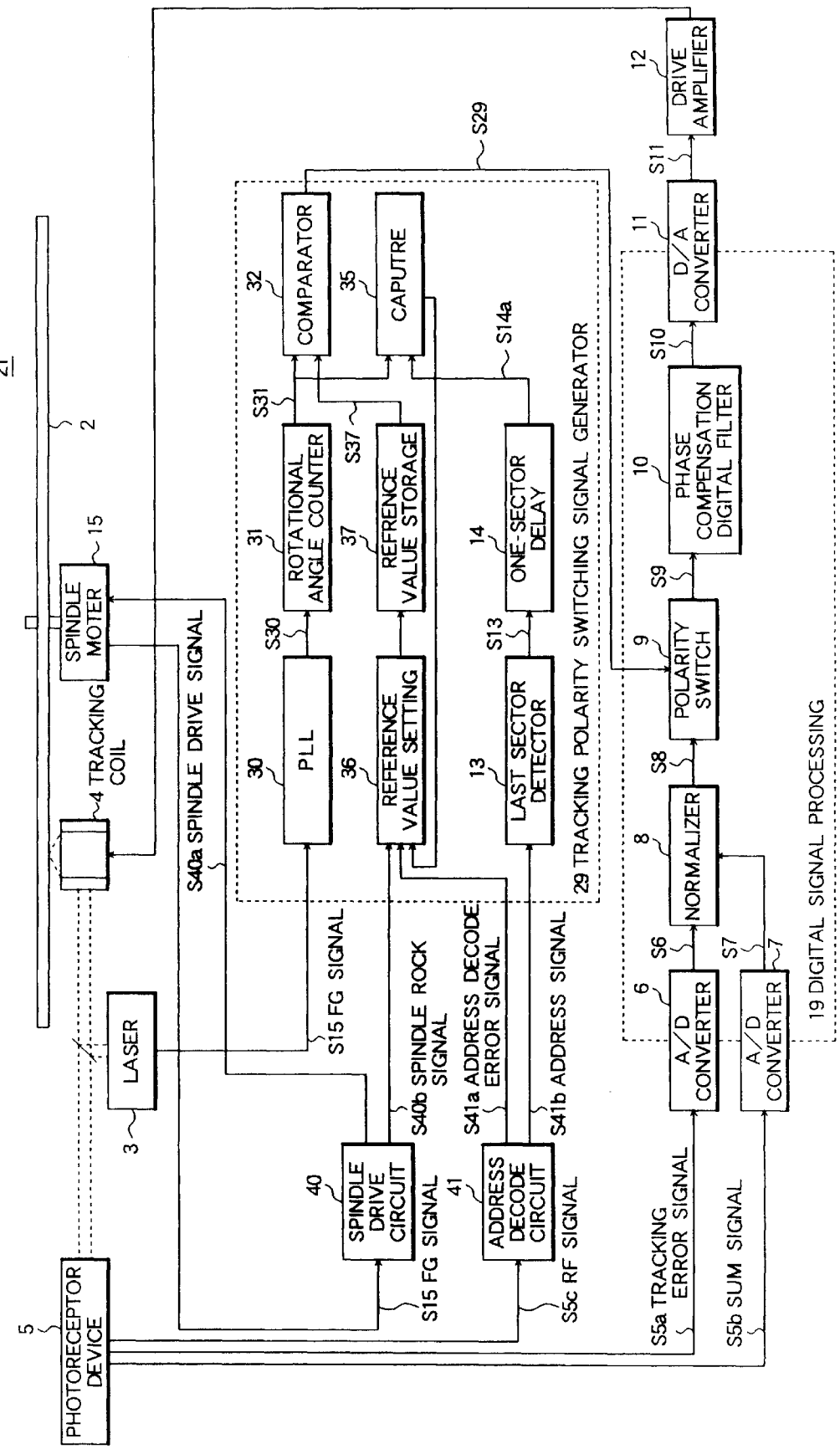
FIG. 6 is a block diagram of an optical disk drive for realizing a tracking servo control of a recording and reproduction apparatus of a DVD-RAM disk of an embodiment of the present invention.

FIG. 6 is a block diagram of an optical disk drive 21 for realizing functions related to a tracking servo control of a recording and reproduction apparatus of a DVD-RAM disk according to the present embodiment.

The optical disk drive 21 performs the tracking servo control of a DVD-RAM disk 2 of the single spiral format driven by the spindle motor 15.

As shown in FIG. 6, the optical disk drive 21 comprises a polarity switching signal generator 29, a digital signal processor 19, a spindle controller 40, an address decoder 41, and a tracking coil 4.

The spindle controller 40 generates a spindle drive signal S40a which it outputs to the spindle motor 15 and generates a spindle lock signal S40b, indicating whether the spindle motor 15 is stable at a target number rotating speed (that is, if the spindle motor 15 is in a locked state) on the basis of a periodicity of a FG signal S15 from the spindle motor 15 shown in FIG. 7A, which it outputs to a reference value setting circuit 36.

The address decoder 41 generates an address signal S41b on the basis of an RF signal S5c input from a photoreceptor 5 and outputs the address signal S41b to a last sector detector 13. Further, the address decoder 41 generates an address decode error signal S41a indicating whether a decode error has occurred in the read address on the basis of the RF signal S5c input from the photoreceptor 5 and outputs the address decode error signal S41a to the reference value setting circuit 36.

Digital Signal Processor 19

Figure 1:
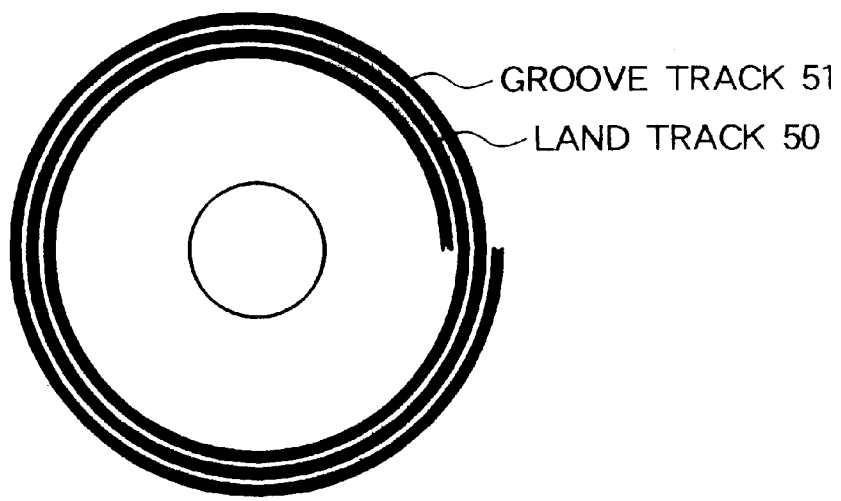
FIG. 1 is a view for explaining the arrangement of grooves and lands on a recording surface of a DVD-RAM disk of a double spiral format.
Figure 2:
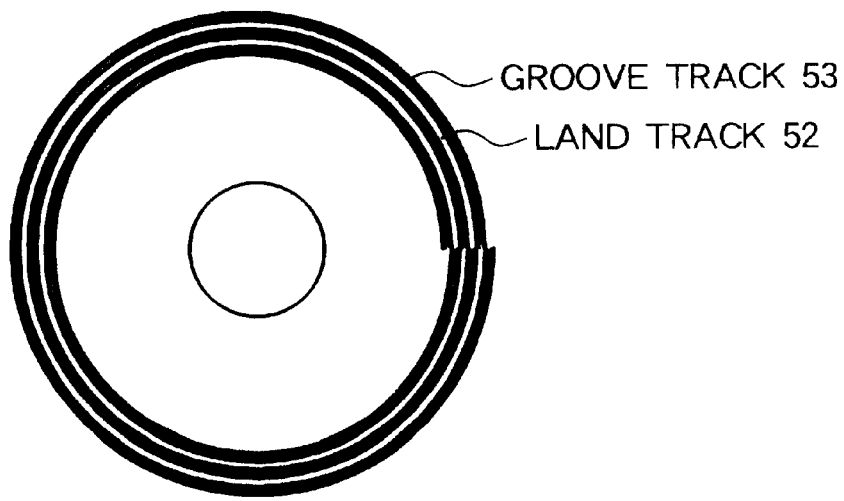
FIG. 2 is a view for explaining the arrangement of grooves and lands on a recording surface of a DVD-RAM disk of a single spiral format.
Figure 3:
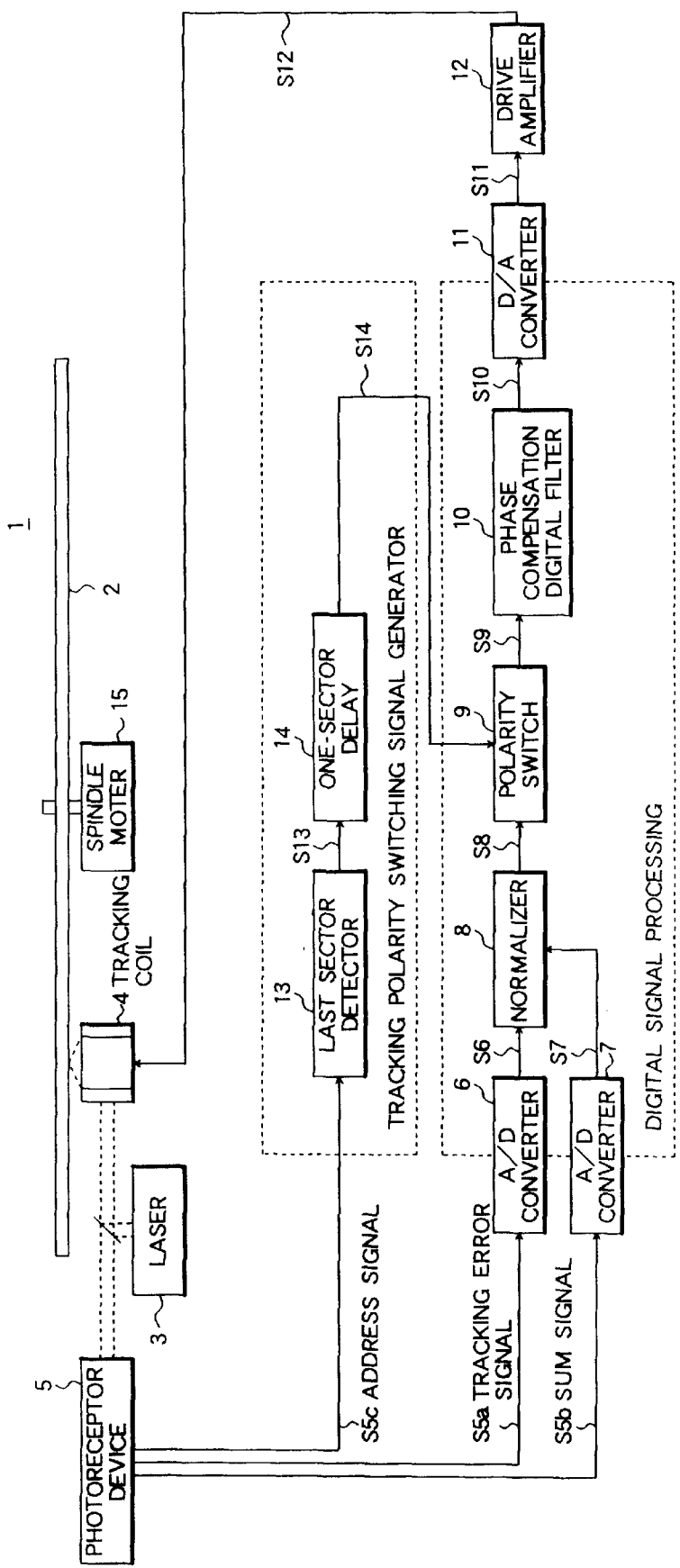
FIG. 3 is a block diagram of an optical disk drive for realizing tracking servo control of a recording and reproduction apparatus of a DVD-RAM of the related art.
Figure 4:
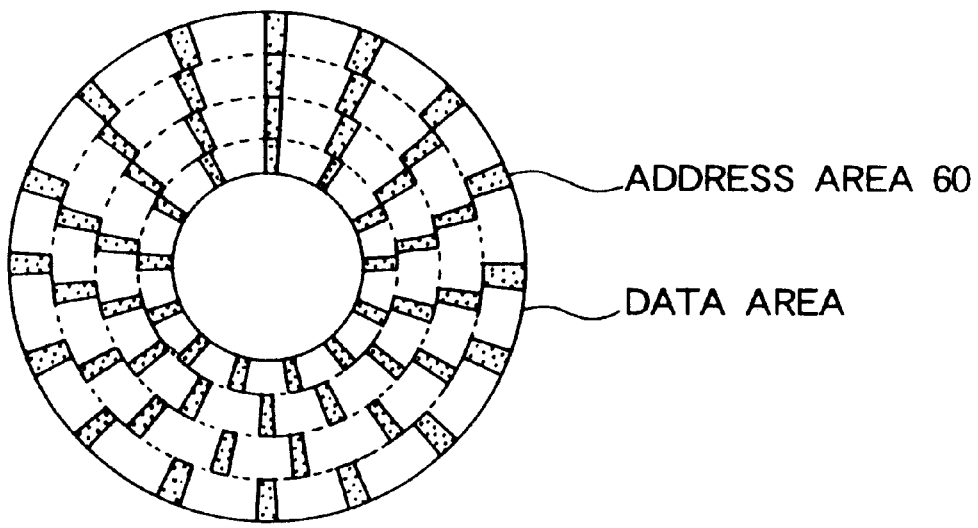
FIG. 4 is a view for explaining the arrangement of data areas and address areas on a recording surface of a DVD-RAM disk of a zoned CLV format.
Figure 5:
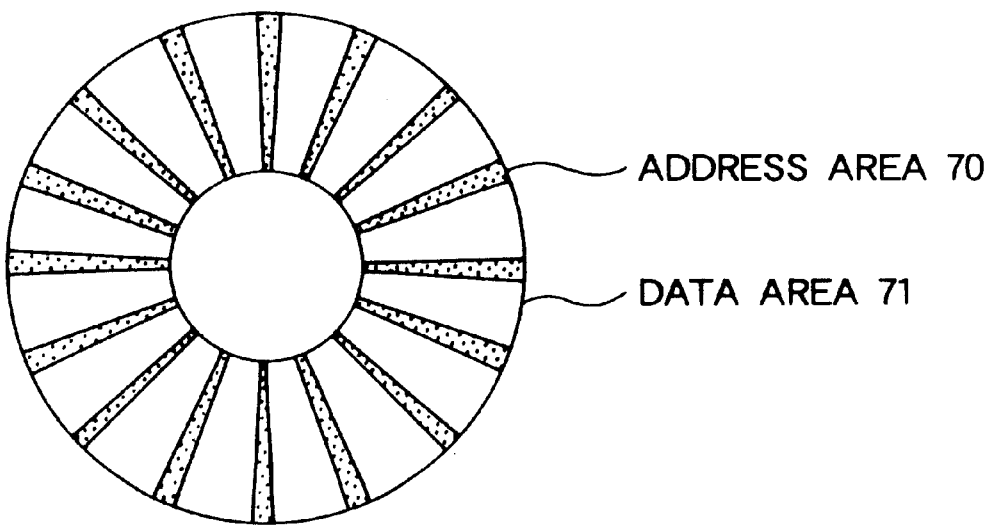
FIG. 5 is a view for explaining the arrangement of data areas and address areas on a recording surface of a DVD-RAM disk of a CAV format.

The digital signal processor 19 is basically the same as the digital processor of the optical disk drive 1 shown in FIG. 3 described above.

That is, the digital signal processor 19 comprises A/D converters 6 and 7, a normalizer 8, a polarity switch 9, a phase compensation digital filter 10, and a D/A converter 11.

The A/D converter 6 converts the analog tracking error signal S5a from the photoreceptor 5 to a digital tracking error signal S6 and outputs the tracking error signal S6 to the normalizer 8.

The A/D converter 7 converts the analog sum signal S5b from the photoreceptor 5 to a digital sum signal S7 and outputs the sum signal S7 to the normalizer 8. the normalizer 8 normalizes the tracking error signal S6 so that its level does not change on the basis of the sum signal S7 and outputs the normalized tracking error signal S8 to the polarity switch 9.

The polarity switch 9 inverts the polarity of the tracking error signal S8 in accordance with need based on the polarity switching signal S29 to produce the tracking error signal S9. The tracking error signal S9 is output to the phase compensation digital filter 10.

The phase compensation digital filter 10 performs phase compensation on the tracking error signal S9 and outputs the phase compensated tracking error signal S10 to the D/A converter 11.

The D/A converter 11 converts the digital tracking error signal S10 to an analog tracking error signal S11 and outputs the tracking error signal S11 to a drive amplifier 12.

Polarity Switching Signal Generator 29

As shown in FIG. 6, the polarity switching signal generator 29 comprises a PLL circuit 30, a rotational angle counter 31, a comparator 32, a capture circuit 35, a reference value setting circuit 36, a reference value storage circuit 37, a last sector detector 13, and a one-sector delay unit 14.

The last sector detector 13 and the one-sector delay unit 14 are the same as the last sector detector 13 and the one-sector delay unit 14 of the optical disk drive of the related art shown in FIG. 3 described above.

The last sector detector 13 generates a last sector signal S13 indicating the sector immediately before the point where a land and a groove are switched on the basis of the address signal S41b input from the address decoder 41 and outputs this to the last sector detector 13.

The one-sector delay unit 14 delays the last sector signal S13 by one sector's worth of time and outputs the result to the capture circuit 35 as the last sector signal S14a shown in FIG. 7C.

The PLL circuit 30 performs PLL processing with respect to the FG signal shown in FIG. 7A input from the spindle motor 15, then outputs the same as an FG signal S30 shown in FIG. 7B to the rotational angle counter 31.

The rotational angle counter 31 counts the pulses included in the FG signal S30, generates a rotational angle signal S31 indicating the rotational angle of the DVD-RAM disk 2 on the basis of the result of the count, and outputs the same to the comparator 32.

The capture circuit 35 captures a rotational angle value indicated by the rotational angle signal S31 from the rotational angle counter 31 in accordance with a timing of reproduction of the last sector on the basis of the last sector signal S14a from the one-sector delay unit 14.

The reference value setting circuit 36 functions to determine whether or not the rotational angle value captured by the capture circuit 35 is correct and updates the reference value stored in the reference value storage circuit 37 only when it determines it is correct.

Specifically, the reference value setting circuit 36, in the case where the spindle lock signal S40b indicates a state of lock and error has not occurred in the address decode error signal s41a, reads out the rotational angle value captured in the capture circuit 35 as an effective value, calculates the average value of the read rotational angle value and a plurality of rotational angle values read from the capture circuit 35 in the past, and updates the reference value already stored in the reference value storage circuit 37 by using the average value as a new reference value. In this way, the reference value stored in the reference value storage circuit 37 can be stabilized by finding the average value of the rotational angle values by the capture circuit 35 even in the case where the rotational angle values captured in the capture circuit 35 change slightly.

The comparator 32 compares the rotational angle value indicated by the rotational angle signal S31 from the rotational angle counter 31 and the reference value stored in the reference value storage circuit 37, generates the polarity switching signal S29 which generating a pulse at the time when the result of the comparison indicates coincidence as shown in FIG. 7E, and outputs the polarity switching signal S29 to the polarity switch 9.

Below, the operation of the optical disk drive 21 shown in FIG. 6 will be explained.

Here, an explanation will be given of mainly the operation of the polarity switching signal generator 29 for the case where the address decoder 1 has suitably decoded the address and for the case where it has not.

Case Where Address Has Been Correctly Decoded

In this case, the address decoder 41 has correctly decoded the address read from the DVD-RAM disk on the basis of an RF signal S5c in accordance with the result of reproduction from the DVD-RAM disk 2 and outputs a valid address signal S41b to the last sector detector 13. Further, it outputs an address decode error signal S41a indicating that the address has been correctly decoded to the reference value setting circuit 36.

Next, the last sector detector 13 generates a last sector signal S13 indicating the sector immediately before the point where a land and a groove are switched on the basis of the address signal S41b and outputs the last sector signal S13 to the last sector detector 13.

The last sector signal S13 is delayed by exactly one sector's worth of time in the one-sector delay unit 14, then is output to the capture circuit 35 as the last sector signal S14a generating a pulse at, for example, the timing A shown in FIG. 7C.

Next, the capture circuit 35 captures a rotational angle value indicated by the rotational angle signal S31 at a timing in accordance with the last sector indicated by the last sector signal S14a.

Next, since the spindle lock signal S40b indicates the lock state and the address decode error signal S41a indicates that the decoding has been performed correctly, the reference value setting circuit 36 uses the new reference value of the average value, calculated using the rotational angle value captured by the capture circuit 35, to update the reference value stored in the reference value storage circuit 37.

Next, the comparator 32 compares the updated reference value stored in the reference value storage circuit 37 and the rotational angle value indicated by the rotational angle signal S31 and switches the polarity switching signal S29 when they match, that is, at the timing B shown in FIG. 7E.

Case Where Error Occur in Decoding of Address

In this case, in the address decoder 41, error occurs in the decoding of the address read from the DVD-RAM on the basis of the RF signal S5c in accordance with the result of the reproduction from the DVD-RAM disk 2 and the address signal S41b output to the last sector detector 13 becomes erroneous. Further, an address decode error signal S41a indicating error is output to the reference value setting circuit 36.

The last sector detector 13 does not detect the last sector and a pulse is not generated in the last sector signal S14a output from the one-sector delay unit 14 at the timing C shown FIG. 7C where a pulse should be generated.

As the result, the capture circuit 35 does not capture the rotational angle value indicated by the rotational angle signal S31.

Further, since the spindle lock signal S40b indicates a lock state and the address decode error signal S41a indicates error, the reference value setting circuit 36 does not update the reference value stored in the reference value storage circuit 37.

Next, the comparator 32 compares the reference value which has been stored in the reference value storage circuit 37 and the rotational angle value indicated by the rotational angle signal S31 and switches the polarity switching signal S29 when they match, that is, at the timing D shown in FIG. 7E.

In this way, according to the optical disk drive 21, even when no pulse is generated in the last sector signal S14a at the timing C shown in FIG. 7C, the polarity switching signal S29 output from the polarity switching signal generator 29 can be appropriately switched at the timing D shown in FIG. 7E. Accordingly, the polarity switching signal S29 is not disturbed even when the recording surface of the DVD-RAM disk 2 is dirty and the last sector cannot be detected or when a spot cuts across tracks.

Further, since the rotational angle value indicated by the rotational angle signal S31 corresponds to the revolution of the DVD-RAM disk 2, in the case where a DVD-RAM disk 2 of a zoned CLV format is used, even in the transient state in which the rotating speed changes, the polarity switching signal S29 can be switched appropriately at the point where disk is switched.

According to the optical disk drive 21, therefore, the polarity of the tracking error signal read from the DVD-RAM disk 2 and the polarity to be actually controlled can be kept matched at all times and stable tracking servo control can be realized.

FIGS. 8A to 8C are views for explaining the tracking error signal and the polarity switching signal in a seek operation moving across tracks of the DVD-RAM disk 2.

Here, FIG. 8A is a waveform diagram of a tracking error signal of the related art where the polarity is not controlled, FIG. 8B is a waveform diagram of the tracking error signal shown in FIG. 6 where the polarity is controlled, and FIG. 8C is a waveform diagram of the polarity switching signal S29 shown in FIG. 6.

As shown in FIG. 8A, when the polarity is not controlled, the tracking error signal becomes discontinuous at the disk switching timings a, b, and c. Accordingly, the traverse counter counting the number of tracks traversed cannot correctly count, error occurs in the result of the count, and the accuracy of the seek operation is reduced.

As opposed to this, according to the optical disk drive 21 of the present embodiment, as shown in FIG. 8C, the level of the polarity switching signal S29 is switched at the disk switching timings a, b, and c, and the polarity of the tracking error signal S8 is inverted in the polarity switch 9. As a result, the waveform of the tracking error signal S9 becomes continuous as shown in FIG. 8B. Therefore, the traverse counter can obtain the proper count and a high precision seek operation can be realized.

As described above, according to the optical disk drive 21, a high precision polarity switching signal S29 can be generated in the tracking servo control at the time of reproduction from a DVD-RAM disk 2 of the single spiral format. That is, according to the optical disk drive 21, even in the case where the recording surface of the DVD-RAM disk 2 becomes dirty and the last sector could not be detected or in the case where a spot cuts across tracks, a high precision polarity switching signal S29 can be generated.

Further, according to the optical disk drive 21, when a DVD-RAM disk 2 of the zoned CLV or other format is used, even in the transient state in which the rotating speed is changing, a high precision polarity switching signal S29 can be generated.

As a result, according to the optical disk drive 21, the tracking servo control can be performed stably and the precision of the seek operation can be improved.

The present invention is not limited to the embodiment described above.

For example, in the embodiment described above, a DVD-RAM was given as an example of an optical disk, but the optical disk of the present invention may also be another optical disk of the land-groove system.

Further, in the embodiment described above, a PLL circuit 30 was provided for achieving a high resolution of the angle of the FG signal S15, however, when a high resolution of the angle is not required or when the FG signal S15 has a high resolution of angle, it is possible to configure the invention without the PLL circuit 30.

Summarizing the effects of the invention, according to the polarity switching signal generator and method described above, a suitable polarity switching signal for inverting the polarity of the tracking error signal can be stably generated.

Further, according to the optical disk drive described above, stable tracking servo control can be realized.

What is claimed is:

1. A polarity switching signal generator for generating a polarity switching signal for use in switching a polarity of a tracking error signal in accordance with a switching position between a land and groove during tracking servo control of an optical disk in which lands and grooves are alternately arranged in a radical direction, comprising:

a rotational angle generating means for generating a rotational angle of said optical disk on the basis of a rotation signal based on rotation of said optical disk input from a driving means for driving the rotation of said optical disk;

a switching position detecting means for detecting a switching position between a land and groove on the basis of an address signal read from said optical disk;

a rotational angle determining means for determining said rotational angle generated by said rotational angle generating means at a timing in accordance with the detection of the switching position between a land and groove;

a reference value storing means for storing a reference value to be compared with said rotational angle generated by said rotational angle generating means;

a reference value setting means for updating the reference value stored in said reference value storing means with the rotational angle determined by said rotational angle determining means when said address signal is correct; and a comparing means for generating a polarity switching signal instructing the inversion of the polarity of the tracking error signal when the rotational angle generated by said rotational angle generating means matches with the reference value stored in said reference value storing means.

2. A polarity switching signal generator as set forth in claim 1, wherein said reference value storing means holds the stored reference value when error has occurred in said address signal.

3. A polarity switching signal generator as set forth in claim 1, wherein said rotation signal comprises an FG signal.

4. A polarity switching signal generator as set forth in claim 1, further comprising a phase synchronization circuit for receiving as input the rotation signal based on the rotation of said optical disk from said driving means and generating a new rotation signal improved in resolution from the input rotation signal and wherein said rotational angle generating means generates a rotational angle of said optical disk on the basis of said new rotation signal input from said phase synchronization circuit.

5. A polarity switching signal generator as set forth in claim 1, wherein said optical disk is a rewritable optical disk.

6. An optical disk drive for driving an optical disk where lands and grooves are alternately arranged in a radical direction, comprising:

a rotational angle generating means for generating a rotational angle of said optical disk on the basis of a rotation signal based on rotation of said optical disk input from a driving means for driving the rotation of said optical disk;

a switching position detecting means for detecting a switching position between a land and groove on the basis of an address signal read from said optical disk;

a rotational angle determining means for determining said rotational angle generated by said rotational angle generating means at a timing in accordance with the detection of the switching position between a land and groove;

a reference value storing means for storing a reference value to be compared with said rotational angle generated by said rotational angle generating means:

a reference value setting means for updating the reference value stored in said reference value storing means with the rotational angle determined by said rotational angle determining means when said address signal is correct;

a comparing means for generating a polarity switching signal instructing the inversion of the polarity of the tracking error signal when the rotational angle generated by said rotational angle generating means matches with the reference value stored in said reference value storing means;

a polarity switching means for switching the polarity of a first tracking error signal generated on the basis of the result of the reception of the reflected light of said optical disk on the basis of the polarity switching signal generated by said comparison means to produce a second tracking error signal; and a driving means for driving the optical disk on the basis of said second tracking error signal.

7. An optical disk drive as set forth in claim 6, wherein said reference value storage means holds the stored reference value when error has occurred in said address signal.

8. An optical disk drive as set forth in claim 7, wherein said rotation signal is an FG signal.

9. An optical disk drive as set forth in claim 6, further comprising a phase synchronization circuit for receiving as input the rotation signal based on the rotation of said optical disk from said driving means and generating a new rotation signal improved in resolution from the input rotation signal and wherein said rotational angle generating means generates a rotational angle of said optical disk on the basis of said new rotation signal input from said phase synchronization circuit.

10. An optical disk drive as set forth in claim 6, wherein said optical disk is a rewritable optical disk.

11. A polarity switching signal generation method for generating a polarity switching signal for use in switching a polarity of a tracking error signal in accordance with a switching position between a land and groove during tracking servo control of an optical disk in which lands and grooves are alternately arranged in a radical direction, comprising the steps of:

generating a rotational angle of said optical disk on the basis of a rotation signal based on rotation of said optical disk input from a driving means for driving the rotation of said optical disk;

detecting a switching position between a land and groove on the basis of an address signal read from said optical disk;

determining said generated rotational angle at a timing in accordance with the detection of the switching position between a land and a groove;

updating a reference value with the rotational angle determined when said address signal is correct; and generating a polarity switching signal instructing the inversion of the polarity of the tracking error signal when the generated rotational angle matches with the reference value.

12. A polarity switching signal generation method as set forth in claim 11, wherein said rotation signal is an FG signal.

13. A polarity switching signal generation method as set forth in claim 11, further comprising the steps of:

receiving as input the rotation signal based on the rotation of said optical disk from said driving means and generating a new rotation signal improved in resolution from the input rotation signal and generating a rotational angle of said optical disk on the basis of said new rotation signal input.

14. A polarity switching signal generation method as set forth in claim 11, wherein said optical disk comprises a rewritable optical disk.

* * * * *

UNITED STATES PATENT AND TRADEMARK OFFICE
CERTIFICATE OF CORRECTION

PATENT NO. : 6,233,207 B1
DATED : May 15, 2001
INVENTOR(S) : Tanaka

It is certified that error appears in the above-identified patent and that said Letters Patent is hereby corrected as shown below:

<u>Title page,</u>
Assignee, should read as follows:
[73]    Assignee: Sony Corporation, Tokyo (JP)

Signed and Sealed this

Sixth Day of November, 2001

Attest:

*Nicholas P. Godici*

NICHOLAS P. GODICI
*Attesting Officer*    *Acting Director of the United States Patent and Trademark Office*